United States Patent
Xu

(10) Patent No.: US 8,157,031 B2
(45) Date of Patent: Apr. 17, 2012

(54) MULTI-LEGGED WALKING DEVICE

(75) Inventor: Bao-Qin Xu, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, New Taipei (TW)

(*) Notice: Subject to any disclaimer, the term of this patent is extended or adjusted under 35 U.S.C. 154(b) by 164 days.

(21) Appl. No.: 12/796,618

(22) Filed: Jun. 8, 2010

(65) Prior Publication Data

US 2011/0048815 A1    Mar. 3, 2011

(30) Foreign Application Priority Data

Aug. 26, 2009 (CN) .......................... 2009 1 0306132

(51) Int. Cl.
*B62D 51/06* (2006.01)

(52) U.S. Cl. ............ 180/8.1; 180/8.2; 180/8.5; 180/8.6; 280/5.26; 280/5.28; 280/5.32; 280/5.3; 280/1.204; 280/1.181

(58) Field of Classification Search ............... 180/8.1, 180/8.2, 8.5, 8.6; 280/5.26, 5.28, 5.3, 5.32, 280/1.204, 1.181
See application file for complete search history.

(56) References Cited

U.S. PATENT DOCUMENTS

| | | | | |
|---|---|---|---|---|
| 1,576,956 A * | 3/1926 | Dunshee | ...................... | 446/356 |
| 2,941,481 A * | 6/1960 | Philbrick | ........................ | 105/31 |
| 4,095,661 A * | 6/1978 | Sturges | ........................ | 180/8.6 |
| 4,365,437 A * | 12/1982 | Jameson | ...................... | 446/355 |
| 4,527,650 A * | 7/1985 | Bartholet | ...................... | 180/8.6 |
| 4,657,098 A * | 4/1987 | Wilcox | ......................... | 180/8.1 |
| 5,423,708 A * | 6/1995 | Allen | ........................... | 446/356 |
| 6,422,329 B1 * | 7/2002 | Kazerooni et al. | ........... | 180/19.3 |
| 6,478,314 B1 * | 11/2002 | Klann | ........................... | 280/28.5 |
| 6,527,071 B1 * | 3/2003 | Villedieu | ...................... | 180/8.1 |
| 7,143,850 B2 * | 12/2006 | Takenaka et al. | ............... | 180/8.6 |
| 8,042,627 B2 * | 10/2011 | Yang et al. | ..................... | 180/8.6 |
| 2008/0210477 A1 * | 9/2008 | Takenaka et al. | ............... | 180/8.6 |

* cited by examiner

*Primary Examiner* — Anne Marie Boehler
*Assistant Examiner* — Marlon Arce
(74) *Attorney, Agent, or Firm* — Altis Law Group, Inc.

(57) ABSTRACT

A multi-legged walking device includes a crankshaft, a plurality of linkage bar mechanisms, a support member, and a driving device. The crankshaft includes a plurality of main journals and crankpin journals. The plurality of linkage bar mechanisms is spaced from and substantially parallel to each other. The linkage bar mechanisms include a plurality of frames. Each frame is rotatably connected to one of the plurality of main journals. Each linkage bar mechanism includes a connecting bar, a first rocker, a second rocker, and a leg. Two ends of the connecting bar are rotatably connected to one of the crankpin journals and the leg. Two ends of the first rocker are rotatably connected to one of the plurality of frames and the leg. Two ends of the second rocker are rotatably connected to one of the plurality of frames and the connecting bar. The support member is fixed to the frames.

9 Claims, 5 Drawing Sheets

MULTI-LEGGED WALKING DEVICE

BACKGROUND

1. Technical Field

The present disclosure relates to walking devices and, more particularly, to a walking device having a plurality of legs.

2. Description of Related Art

It is difficult to traverse certain surfaces with wheeled devices. Certain surfaces, such as slippery, sandy, icy, muddy, or snowy surfaces, often result in complete immobilization of the wheeled device. Other difficult surfaces, such as stepped, obstructed, or uneven surfaces, frequently create insurmountable barriers for wheeled devices. It would be desirable to provide a walking device which would simulate the gait of an animal to overcome the shortcomings of wheeled devices.

BRIEF DESCRIPTION OF THE DRAWINGS

The components in the drawings are not necessarily drawn to scale, the emphasis instead being placed upon clearly illustrating the principles of the multi-legged walking device. Moreover, in the drawings, like reference numerals designate corresponding parts throughout the several views.

DETAILED DESCRIPTION

Figure 1:
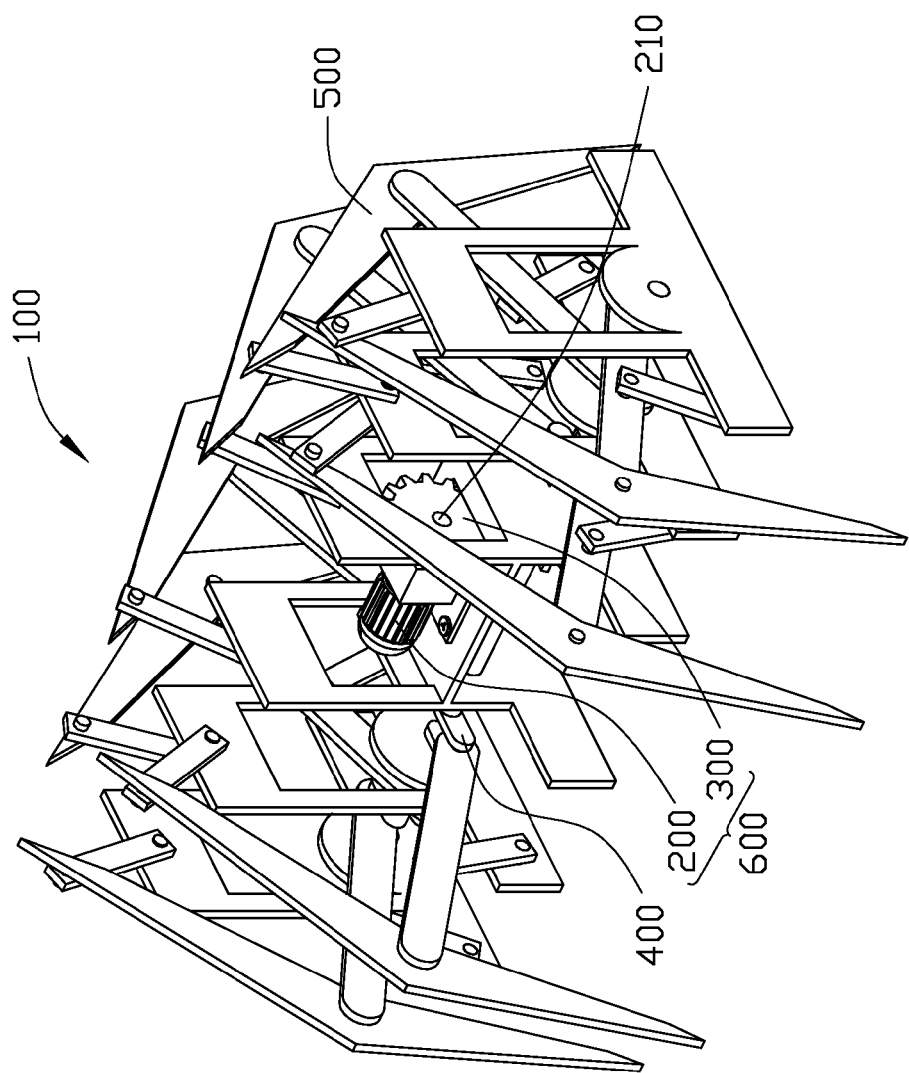
FIG. 1 is an isometric view of a multi-legged walking device in accordance with an exemplary embodiment.

Embodiments of the present disclosure will now be described in detail below, with reference to the accompanying drawings. Referring to FIG. 1, a walking device 100 includes a motor 200, a transmission mechanism 300, a crankshaft 400, and a plurality of linkage bar mechanisms 500. The motor 200 and the transmission mechanism 300 constitute a driving device 600 to drive the crankshaft 400 to rotate. The motor 200 includes a motor shaft 210.

Figure 2:
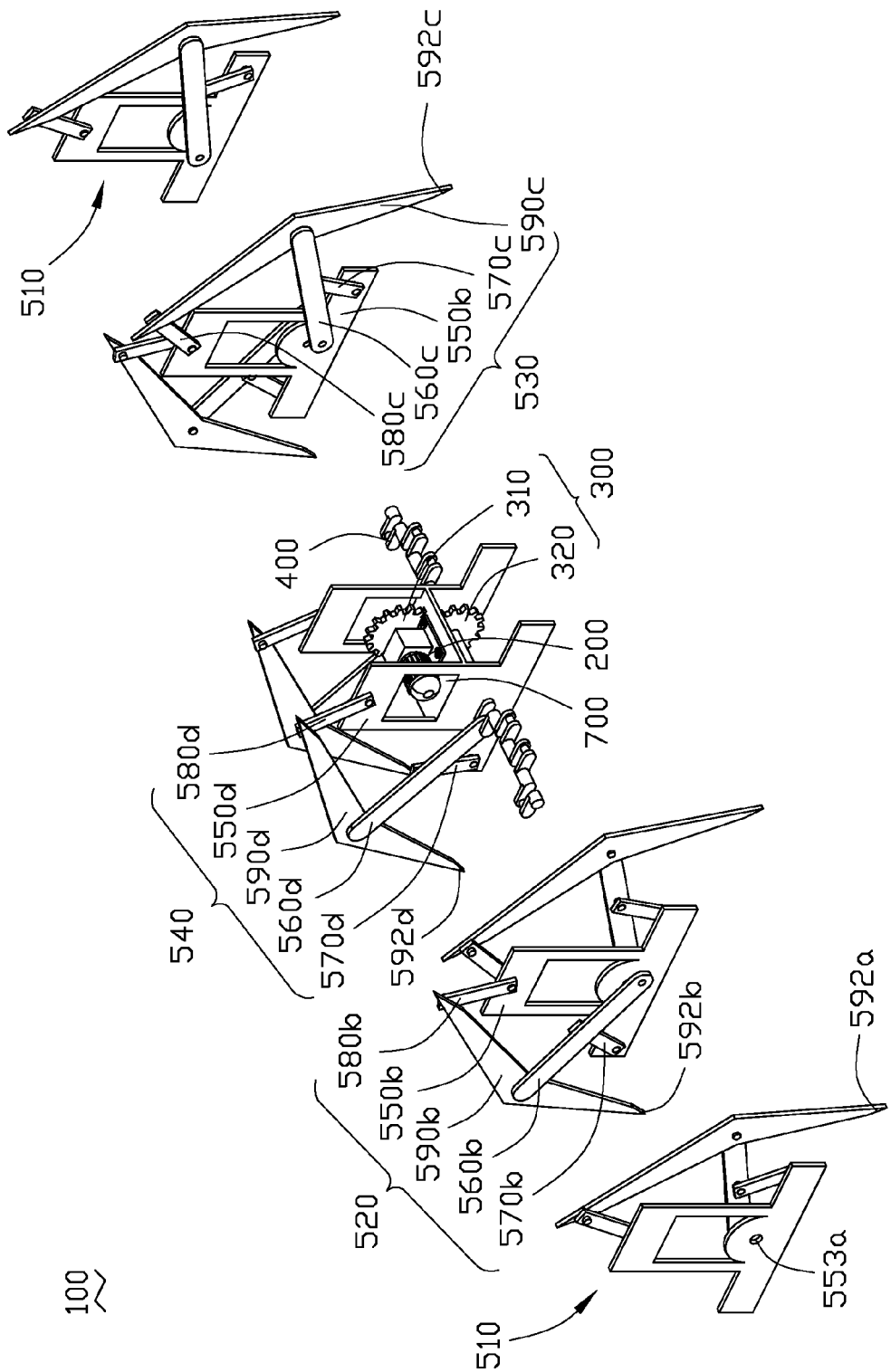
FIG. 2 is an isometric, exploded view of the multi-legged walking device of FIG. 1.
Figure 3:
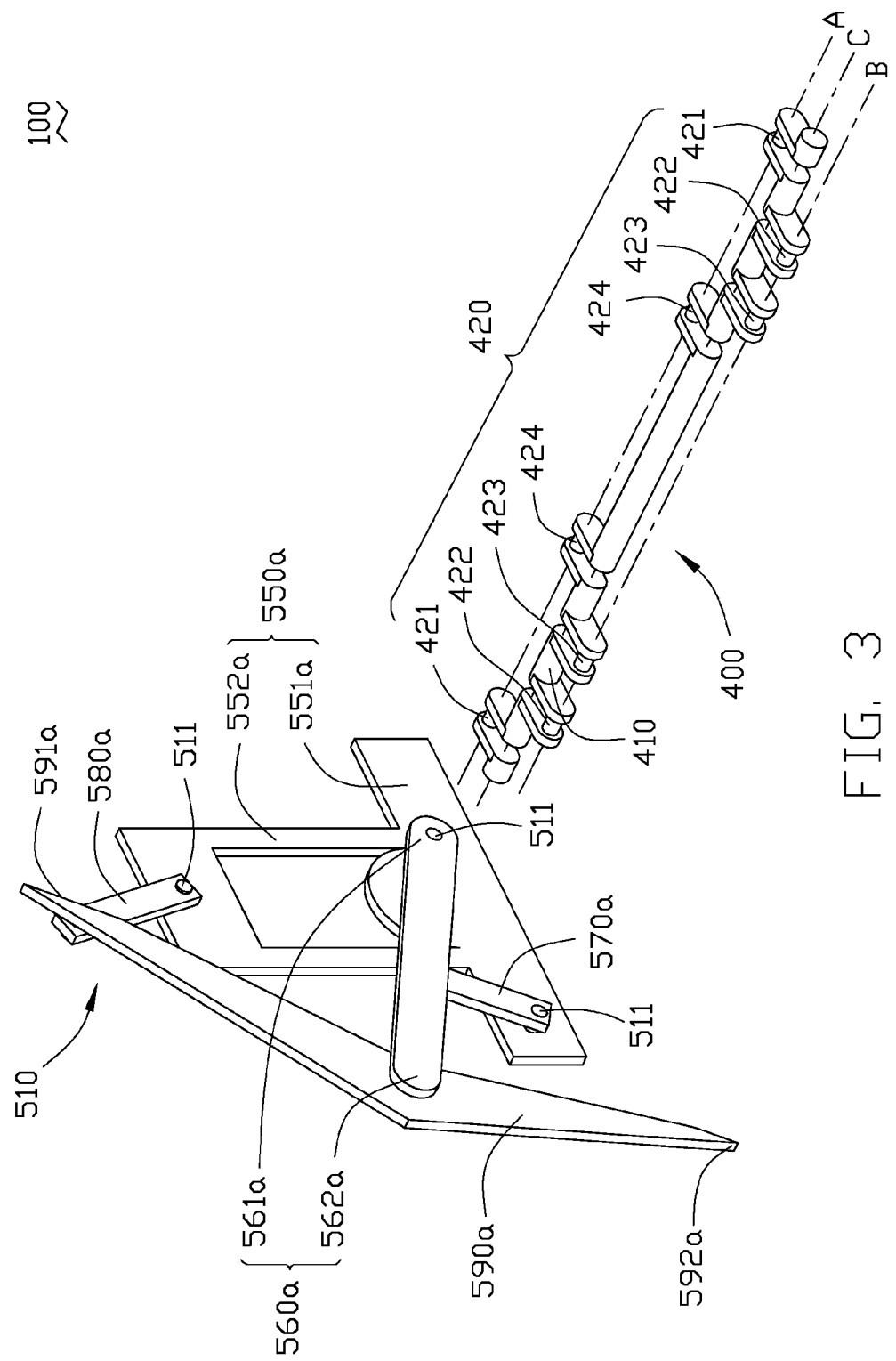
FIG. 3 is another isometric, exploded view of the multi-legged walking device of FIG. 1 with certain elements omitted for clarity.

Referring to FIGS. 2 and 3, the transmission mechanism 300 includes a drive gear 310 and a slave gear 320. The drive gear 310 is fixed to the motor shaft 210. The slave gear 320 is fixed to the crankshaft 400 and engages the drive gear 310 to transmit rotation from the motor shaft 210 to the crankshaft 400.

The crankshaft 400 includes a plurality of main journals 410 and crankpin journals 420. The number of the crankpin journals 420 is eight. In an alternative embodiment, the number of the main journals 410 and the crankpin journals 420 may vary according to need. The crankpin journals 420 are arranged at opposite sides of the main journals 410. The eight crankpin journals 420 include two first connecting rod journals 421, two second connecting rod journals 422, two third connecting rod journals 423, and two fourth connecting rod journals 424. The first connecting rod journals 421 are arranged at two opposite ends of the crankshaft 400, respectively, and are at the same side of the crankshaft 400. The second and third connecting rod journals 422 and 423 are arranged opposite to the first connecting rod journals 421. The fourth connecting rod journals 424 are arranged between the third connecting rod journals 423, but at opposite side of the crankshaft 400. In the embodiment, the first and fourth connecting rod journals 421 and 424 share the same axis A, while the second and third connecting rod journals 422 and 423 share the same axis B. Both axes A and B are substantially parallel to and coplanar with the axis C of the main journals 410. In the embodiment, the slave gear 320 is fixed to the main journal 410 between the fourth connecting rod journals 424.

In the embodiment, four pairs of linkage bar mechanisms 500 are connected to the crankshaft 400. The linkage bar mechanisms 500 are arranged substantially parallel to and spaced from each other. The four pairs of linkage bar mechanisms 500 are substantially the same as each other and are labeled with 510, 520, 530 and 540 for better understanding. Detailed descriptions will be made with reference to the linkage bar mechanism 510.

As shown in FIG. 3, each of the linkage bar mechanisms 510 includes a frame 550a, a connecting bar 560a, a first rocker 580a, a second rocker 570a, and a leg 590a. The frame 550a includes a base 551a and a protruding plate 552a protruding from the base 551a. The base 551a defines an axle hole 553a, through which one main journal 410 extends. The connecting bar 560a is a thin plate and includes a first end 561a and a second end 562a that are rotatably connected to one crankpin journal 421 and the leg 590a, respectively. Two ends of the first rocker 580a are rotatably connected to the plate 552a and the leg 590a, respectively. Two ends of the second rocker 570a are rotatably connected to the base 551a and the connecting bar 560a, respectively. The leg 590a includes an upper connecting end 591a and a supporting end 592a. In the embodiment, the linkage bar mechanism 510 includes a plurality of frictional axles 511, through which the frame 550a, the connecting bar 560a, the first rocker 580a, the second rocker 570a, and the leg 590a are connected. The frictional axles 511 provide sufficient frictions, such that the frame 550a, the connecting bar 560a, the first rocker 580a, the second rocker 570a, and the leg 590a can be positioned in any desired position.

Each of the linkage bar mechanisms 520 includes a frame 550b, a connecting bar 560b, a first rocker 580b, a second rocker 570b, and a leg 590b, which are arranged similar to that of the linkage bar mechanisms 510. The connecting bar 560b is rotatably connected to one crankpin journal 422. The leg 590b includes a supporting end 592b. The supporting end 592b and the supporting end 592a of the leg 590a are at opposite sides of the crankshaft 400.

Each of the linkage bar mechanisms 530 shares the frame 550b with one linkage bar mechanism 520. The linkage bar mechanisms 530 include a connecting bar 560c, a first rocker 580c, a second rocker 570c, and a leg 590c, which are arranged similar to that of the linkage bar mechanisms 510. The connecting bar 560c is rotatably connected to one crankpin journal 423. The leg 590c includes a supporting end 592c. The supporting end 592c and the supporting end 592a of the leg 590a are at the same sides of the crankshaft 400.

Each of the linkage bar mechanisms 540 includes a frame 550d, a connecting bar 560d, a first rocker 580d, a second rocker 570d, and a leg 590d, which are arranged similar to that of the linkage bar mechanisms 510. The connecting bar 560d is rotatably connected to one crankpin journal 424. The leg 590d includes a supporting end 592d. The supporting end 592d and the supporting end 592a of the leg 590a are at opposite sides of the crankshaft 400. In the embodiment, a supporting plate 700 is fixed to the frames 550d. The motor 200 is fixed to the supporting plate 700 and between the frames 550d. The supporting plate 700 includes an opening (not labeled) through which the drive gear 310 engages the slave gear 320.

Similar to the frame 550a, the frames 550b and 550d define axle holes (not labeled), through which the main journals 410 extend. The crankshaft 400 can thus be rotatably connected to the frames 550a, 550b, and 550d.

Figure 4:
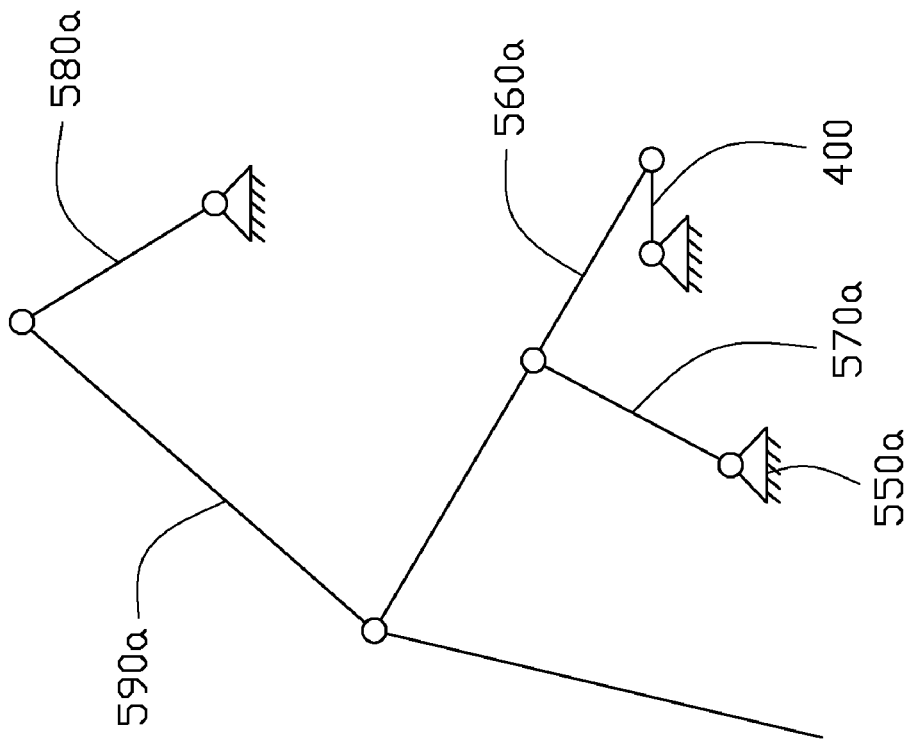
FIG. 4 is a schematic diagram showing the principle of a linkage bar mechanism of the multi-legged walking device of FIG. 1.

Referring to FIG. 4, the linkage bar mechanism 500 and the crankpin journal 420 constitute a 6-bar linkage mechanism, where the crankpin journal 420 acts as a crank. The legs 590a, 590b, 590c, and 590d reciprocate as the crankpin journal 420 revolves, and are configured in such a way that the supporting ends 592a, 592b, 592c, and 592d at opposite sides contact a support surface (i.e. ground) at the same time. Friction between the supporting ends 592a, 592b, 592c, and 592d at opposite sides and the support surface causes the walking device 100 to move with respect to the support surface, just like the friction between shoes and the ground that occur when humans walk.

Table 1 shows the sequence of the supporting ends 592a, 592b, 592c, and 592d contacting the support surface in a rotation cycle of the crankpin journal 420. In the table 1, contacting means that the supporting ends 592a, 592b, 592c, or 592d contacts the support surface, while floating means that the supporting ends 592a, 592b, 592c, or 592d does not contact the support surface.

TABLE 1

| Rotating angle | Supporting end 592a | Supporting end 592b | Supporting end 592c | Supporting end 592d |
|---|---|---|---|---|
| 0 | Floating | Floating | Contacting | Contacting |
| X1 | Contacting | Contacting | Floating | Floating |
| X2 | Floating | Contacting | Contacting | Floating |
| X3 | Contacting | Floating | Floating | Contacting |
| 360 | Floating | Floating | Contacting | Contacting |

Figure 5:
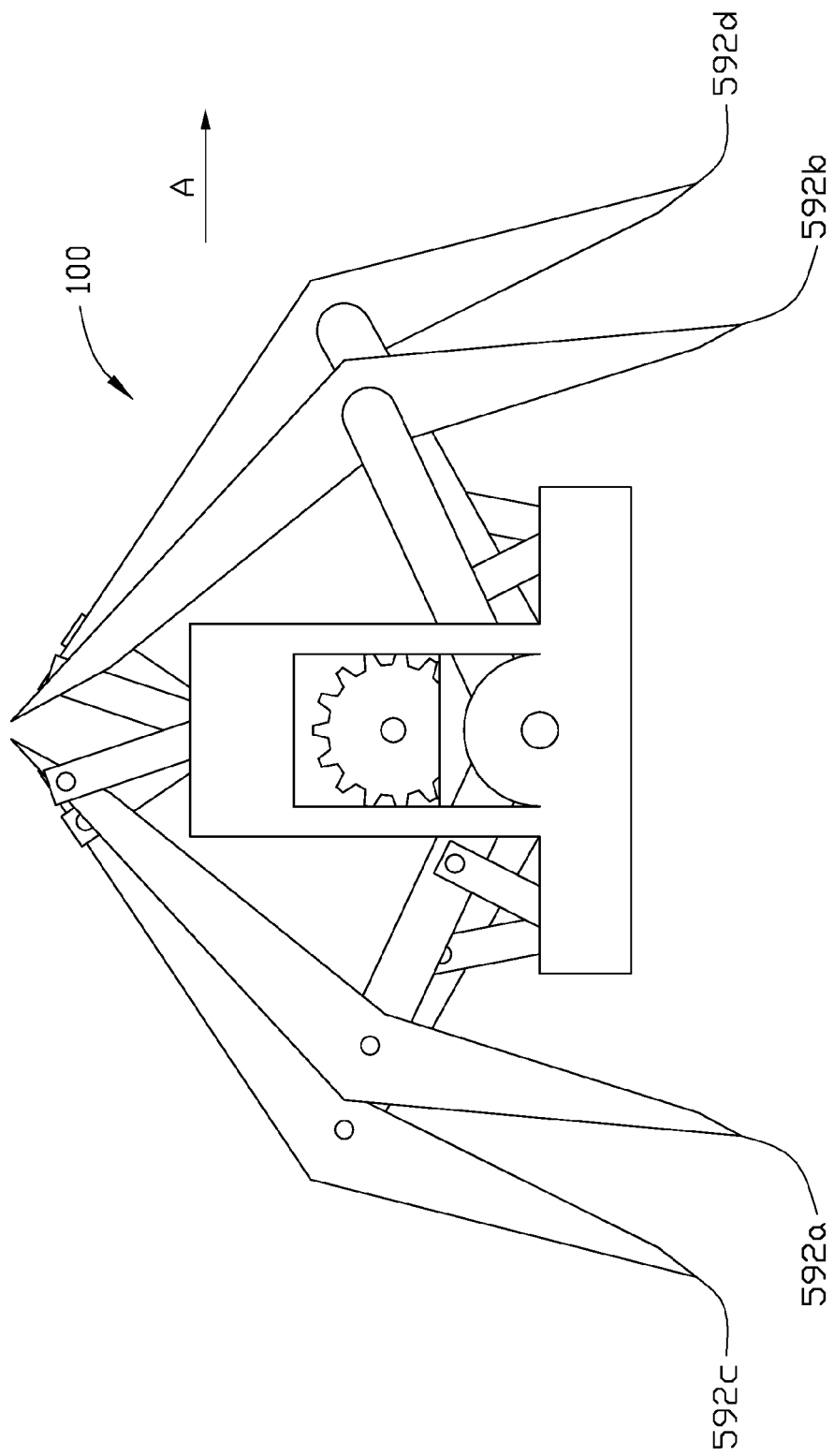
FIG. 5 is a side view of the multi-legged walking device of FIG. 1.

As shown in Table 1, when the crankpin journal 420 stays still (rotating angle of 0), the supporting ends 592c and 592d support the whole walking device 100. After the crankpin journal 420 has rotated X1 degrees, the supporting ends 592a and 592b contact the support surface. Referring to FIG. 5, as the crankpin journal 420 rotates, the supporting end 592b still stays in contact with the support surface, while the supporting end 592a begins to disengage from the support surface until the supporting end 592c starts to contact the support surface, which causes the walking device 100 to move along the direction A.

While various embodiments have been described and illustrated, the disclosure is not to be constructed as being limited thereto. Various modifications can be made to the embodiments by those skilled in the art without departing from the true spirit and scope of the disclosure as defined by the appended claims.

What is claimed is:

1. A multi-legged walking device comprising:
a crankshaft comprising a plurality of main journals and crankpin journals;
a plurality of linkage bar mechanisms spaced from and substantially parallel to each other, the linkage bar mechanisms comprising a plurality of frames, each frame being rotatably connected to one of the plurality of main journals, wherein each linkage bar mechanism comprises a connecting bar, a first rocker, a second rocker, and a leg, two ends of the connecting bar are rotatably connected to one of the crankpin journals and the leg, two ends of the first rocker are rotatably connected to one of the plurality of frames and the leg, two ends of the second rocker are rotatably connected to one of the plurality of frames and the connecting bar;
a support member fixed to the frames; and
a driving device fixed to the support member to drive the crankshaft to rotate;
wherein, the legs of the linkage bar mechanisms comprise supporting ends that are arranged at opposite sides of the crankpin journals and are driven by the driving device to reciprocate, causing at least part of the supporting ends at opposite sides of the crankpin journals to contact a support surface at the same time to generate friction to cause the multi-legged walking device to move with respect to the support surface.

2. The multi-legged walking device according to claim 1, wherein the driving device comprises a motor fixed to the support member, a drive gear, and a slave gear, the motor comprises a motor shaft, to which the drive gear is fixed, the slave gear is fixed to one of the main journals and engages the drive gear to transmit rotation from the motor shaft to the crankshaft.

3. The multi-legged walking device according to claim 1, wherein the crankpin journals are arranged at two sides of the main journals.

4. The multi-legged walking device according to claim 1, wherein at least two of the linkage bar mechanisms share a same one of the plurality of frames.

5. The multi-legged walking device according to claim 1, wherein the number of the linkage bar mechanisms is eight.

6. The multi-legged walking device according to claim 1, wherein the support member is a plate.

7. The multi-legged walking device according to claim 3, wherein the crankpin journals each include an axis, around which the connecting bars rotate, the axes of the crankpin journals are coplanar.

8. The multi-legged walking device according to claim 1, wherein each linkage bar mechanism further comprises a plurality of frictional axles, through which the frame, the first rocker, the second rocker, the connecting bar, and the legs are connected.

9. A multi-legged walking device comprising:
a driving device;
a crankshaft driven by the driving device to rotate and comprising a plurality of main journals and crankpin journals; and
a plurality of linkage bar mechanisms spaced from and substantially parallel to each other, each linkage bar mechanism comprising a frame, each frame being rotatably connected to one of the plurality of main journals via a frictional axle, wherein each linkage bar mechanism comprises a connecting bar, a first rocker, a second rocker, and a leg, two ends of the connecting bar are rotatably connected to one of the crankpin journals and the leg via frictional axles, two ends of the first rocker are rotatably connected to one of the plurality of frames and the leg via frictional axles, two ends of the second rocker are rotatably connected to one of the plurality of frames and the connecting bar via frictional axles;
wherein, the legs of the linkage bar mechanisms comprise supporting ends that are arranged at opposite sides of the crankpin journals and driven by the crankpin journals to reciprocate, which causes some of the supporting ends at opposite sides of the crankpin journals to contact a support surface at the same time to generate friction to cause the multi-legged walking device to move with respect to the support surface.

* * * * *